United States Patent [19]

Findlay et al.

[11] 4,147,626

[45] Apr. 3, 1979

[54] TREATMENT OF MERCURY CONTAMINATED AQUEOUS MEDIA

[75] Inventors: David M. Findlay; Ronald A. N. McLean, both of Montreal, Canada

[73] Assignee: Domtar Inc., Montreal, Canada

[21] Appl. No.: 757,573

[22] Filed: Jan. 7, 1977

[51] Int. Cl.$^2$ ............................ C02C 5/04; C01D 1/08
[52] U.S. Cl. ...................................... 210/52; 423/101; 423/562
[58] Field of Search ......................... 210/42 R, 50-53; 423/101, 562

[56] References Cited

U.S. PATENT DOCUMENTS

| | | | |
|---|---|---|---|
| 3,674,428 | 7/1972 | Dean et al. | 210/50 |
| 3,749,761 | 7/1973 | Dean et al. | 423/562 |
| 3,790,370 | 2/1974 | Lalancette | 210/42 R |
| 3,835,217 | 9/1974 | Dunsmoor | 423/101 X |
| 3,836,442 | 9/1974 | Dean et al. | 423/562 X |
| 3,989,623 | 11/1976 | Neal | 210/51 |

*Primary Examiner*—Thomas G. Wyse
*Attorney, Agent, or Firm*—C. A. Rowley

[57] ABSTRACT

A technique for removing substantially all the elemental mercury from a mercury containing aqueous media by adjusting the pH of the liquid to the range of 7–13, adding a polysulfide in an amount sufficient to combine with the elemental mercury to form a mercury sulfide which is precipitated and preventing the mercury from being resolublized.

7 Claims, No Drawings

TREATMENT OF MERCURY CONTAMINATED AQUEOUS MEDIA

FIELD OF THE INVENTION

The present invention relates to a technique for precipitating mercury from mercury containing aqueous media.

DESCRIPTION OF PRIOR ART

Many methods have been investigated in the attempt to remove mercury from aqueous media, for example solid particles including many ion exchange resins, activated carbon, zinc particles, and solutions of sodium borohydride or stannous chloride (see Mercury Recovery from Contaminated Waste Water and Sludges by Richard Perry, EPA-660/2-74-086 December 1974). None of the above methods were found able to achieve efficient mercury levels below 100 ppb when the starting solutions contained about 2 to 25 ppm. or their capacity was limited so that their effective life was generally shortened by concentrated mercury feeds. Ion exchange resins and activated carbon appear to be most effective as polishing steps after a first stage treatment has removed the bulk of the mercury and are able to treat solutions in the range of 40-100 ppb down to 1-5 ppb.

The generally accepted commercial technique for removal of mercury from aqueous media is to convert the mercury to mercury sulfide which precipitates. This technique generally employs sodium sulfide or sodium hydrosulfide which is added to the contaminated medium under mild alkaline conditions and the mercury sulfide which precipitates may be separated from the liquid by filtering, decanting or the like.

Generally as used throughout the specification the term sulfide is intended to include hydrosulfide.

The present invention provides an improved technique for significantly increasing the amount of elemental mercury that may be removed by precipitation from a contaminated medium.

The mercury present in such contaminated media may be in addition to other forms as elemental mercury and it was believed that the added sulfide reacts, relatively rapidly with the mercury. It has now been found that elemental mercury does not react as quickly as was heretofore thought to form the mercury sulfide, and it is believed for this reason, prior to the present invention processes for precipitating mercury from contaminated media have produce variable results probably dependent on the elemental mercury content in the media.

BRIEF DESCRIPTION OF THE INVENTION

Broadly, the present invention provides a technique for precipitating substantially all of the elemental mercury in a mercury contaminated aqueous medium by adjusting the pH of the medium to the range of 7-13 and then adding a polysulfide in an amount to combine with the mercury to form mercury sulfide which precipitates. When a process stream is so treated, the mercury sulfide formed may be separated by decantation of filtration.

DETAILED DESCRIPTION OF PREFERRED EMBODIMENTS

Further features, objects and advantages will be evident from the following detailed description of the preferred embodiments of the present invention.

Treatment of a contaminated sample containing mercury either in elemental or ionic form, first requires adjustment of the pH into the range of between 7 and 13, preferably 9 to 12. A soluble polysulfide is then added. The soluble polysulfide may be added in the form of say a 40% sodium sulfide or sodium hydrosulfide solution to which is added excess sulphur to form polysulfide in situ. Polysulfide from any other suitable source may be used. The amount of such polysulfide added should be sufficient to combine with substantially all the elementary mercury present to form mercury sulfide.

In the event that both elemental mercury and ionic mercury are present in the contaminated media, it is preferred to use polysulfide together with sulfide. Both polysulfide and sulfide may be used to precipitate ionic mercury. However, a greater weight of polysulfide than sulfide is required to precipitate the same amount of ionic mercury and, for this reason, a medium containing both ionic and elemental mercury is more economically treated by adding both sulfide and polysulfide.

If there is too great an excess of sulfide ions in the treated medium some of the mercury sulfide precipitated may react with excess sulfide ions to form a soluble mercuric disulfide complex.

$$HgS + S^= \rightarrow HgS_2^=$$

The reactions to form mercury sulfide and the mercury disulfide complex are pH dependent and therefore the amount of excess sulfide ion that may be tolerated is dependent on the pH of the media being treated, unless precautions are taken to ensure that the mercury sulfide is not converted into a soluble mercury disulfide complex. Such precautions would include the removing the mercury sulfide precipitate e.g. by filtration, before it can react with the excess sulfide ion or the removing of the excess sulfide ions, e.g. by reaction with ferric chloride or the like. This is facilitated by the fact that the formation of the mercury sulfide occurs more rapidly than the formation of the soluble mercury disulfide complex.

In many cases, where the amount of mercury in the aqueous medium is small, the precautions may be superfluous.

While it is preferred to use sodium as the polysulfide cation, obviously other soluble polysulfides such as potassium, ammonium, magnesium and calcium may be used provided they do not have other deleterious effects on the materials being treated.

Dilute polysulfide solutions are unstable and therefore care must be taken to ensure that the effectiveness of the polysulfide solution is not prematurely destroyed.

The present invention is particularly applicable to chlor-alkali plants using mercury cells and may be used to decontaminate the various effluents from such a plant. In a mercury cell, the mercury acts as the cathode and flows over the bottom of the cell which slopes slightly towards one end. Saturated brine solution is carried over the mercury and carbon anodes are inserted through the top of and cell and extend into the brine. The electrical potential between the anode and cathode draws the chloride ions to the anode where they form elemental chlorine which leaves the cell through a special outlet. The sodium ions are drawn to the mercury cathode where they form elemental sodium which immediately forms an amalgam with a some of the mercury. The mercury solution of the amalgam is carried to a separate compartment referred to as the denuder where water is added to regenerate the mercury from the amalgam while at the same time forming sodium hydroxide and hydrogen gas. The mercury is returned to the cell and the sodium hydroxide and hydrogen gas are removed from the denuder.

The partially depleted brine is also removed from the cell and carries with it some mercury. The depleted brine is fortified by the addition of fresh sodium chloride. The impurities from the fresh sodium chloride are separated in a settling tank and the supernatant (fortified brine) is returned to the cell while the dregs (brine sludge) are carried away for further treatment and disposal. The mercury in the fortified brine returns to the cell and is reused. However the mercury in the brine sludge must be stabilized so that it cannot contaminate the environment.

The major source of mercury contaminated aqueous media from such chlor-alkali plants is the effluent from the cell sewers which collects all of the water from floor washings, spills, purge streams from end boxes in the cells, wash waters, drainage from the caustic filtration area and from tank cleaning. The brine sludge referred to hereinabove is another source and is normally in the form of a sludge (up to about 40% suspended solids). The perimeter sewer which collects a liquid run off from an area adjacent to the plant forms yet another medium that requires treatment.

The following examples relate to treatment of specific effluents from a chlor-alkali plant.

EXAMPLE I

Samples from the holding tank that collects the cell sewer effluent in a chlor-alkali plant were pH adjusted and treated according to the invention by adding polysulfide and sulfide plus a minor amount of a ferric chloride and filtered. The pH was then set at 9 and the treatment repeated with and without sodium polysulfide ($Na_2S_x$ when x is greater than 1). The results given in Table I.

TABLE I

| | TREATMENT OF CELL SEWER EFFLUENT | | | | | | |
|---|---|---|---|---|---|---|---|
| | Treatment Method | | | Mercury After Filtration(ppb) | | Removal of Efficiency of Hg (%) | |
| pH | $Na_2S_x$ ppm | NaHs ppm | $FeCl_3$ ppm | Elemental | Total | Elemental | Total |
| 9 | | control | | 140 | 570 | — | — |
| 7 | 50 | 50 | 100 | 10 | 10 | 93 | 98 |
| 8 | 50 | 50 | 100 | 10 | 11 | 93 | 98 |
| 9 | 50 | 50 | 100 | 4 | 4 | 97 | 99 |
| 10 | 50 | 50 | 100 | 2 | 2 | 99+ | 99+ |
| 11 | 50 | 50 | 100 | 1 | 1 | 99+ | 99+ |
| 12 | 50 | 50 | 100 | 1 | 97 | 99+ | 83 |
| 13 | 50 | 50 | 100 | 4 | 270 | 97 | 53 |
| 14 | 50 | 50 | 100 | 9 | 360 | 94 | 47 |
| 9 | 50 | — | 100 | 10 | 100 | 93 | 98 |
| 9 | — | 50 | 100 | 58 | 94 | 59 | 84 |

It is apparent that the efficiency is considerably better when $Na_2S_x$ is added and that the treatment is pH. dependent. However the optimum pH will vary from plant to plant depending on the overall composition of the media being treated.

EXAMPLE II

Samples from the holding tank which collects the effluent cell sewer in a chlor-alkali plant, were adjusted to differents pH values and treated with polysulfide (50 ppm), NaHS (50 ppm) and $FeCl_3$ (100 ppm). The mercury level before treatment was 11.0 ppm the values after treatment are shown in Table II.

TABLE II

| Polysulfide Precipitation of Mercury at Different pH | | | |
|---|---|---|---|
| pH | Elemental Hg (ppb) | Total Hg (ppm) | % Efficiency for removal of total mercury |
| 8 | <1 | 0.13 | 99 |
| 9 | <1 | 0.04 | 99+ |
| 10 | <1 | 0.04 | 99+ |
| 11 | <1 | 0.03 | 99+ |
| 12 | <1 | 0.02 | 99+ |

EXAMPLE III

In a specific plant trial at a chlor-alkali plant, polysulfide was used to treat the effluent from the cell sewer. This effluent has been traditionally treated by adding NaHS and $FeCl_33$, allowing the solids to settle in a decanter and then filtering.

During the plant trial polysulfide was also added during the treatment of this effluent. This was accomplished by simply adding polysulfide to a 5% NaHS solution which is continually metered into a treatment vessel. The polysulfide, NaHS and $FeCl_3$ concentrations in the water being treated were 20, 37, and 74 ppm respectively.

The average mercury losses in the two weeks prior to polysulfide addition was 0.087 ppm; after polysulfide addition commenced the level dropped to 0.011 ppm which represents an 86.9% reduction in mercury losses from this source. The efficiency of treatment with sulfide averaged 97.84% and when polysulfide was added it increased to 99.71%.

EXAMPLE IV

In a chlor-alkali plant, samples of brine sludge were taken from the brine sludge tank. The major sources of this brine sludge are the brine clarifier, and the brine saturator. A considerable portion of the mercury from these sources is elemental mercury. These samples of brine sludge at pH 10.7, were treated with varying quantities of sodium polysulfide and the solids were then removed by filtration. The mercury in soluble form (in the filtrate) was measured and the results are shown in Table III. Substantially all the mercury in the filtered solids from the sludge is fixed in the form of mercuric sulfide.

TABLE III

| REMOVAL OF MERCURY FROM BRINE SLUDGE FILTRATE WITH POLYSULFIDE | | | |
|---|---|---|---|
| BRINE SLUDGE SAMPLE "A" | | | |
| $Na_2S_x$ added | Elemental Hg | Total Hg | Efficiency of Removal of Hg (%) |

TABLE III-continued

REMOVAL OF MERCURY FROM BRINE SLUDGE FILTRATE WITH POLYSULFIDE

| Na2Sx added (ppm) | Elemental Hg (ppb) | Total Hg (ppb) | Efficiency of Removal Elemental | Total |
|---|---|---|---|---|
| Control | 720 | 1390 | — | — |
| 25 | 13 | 90 | 98 | 94 |
| 50 | <1 | 30 | 99+ | 98 |
| 50* | <1 | 20 | 99+ | 99 |
| 100 | <1 | 60 | 99+ | 96 |
| 100* | <1 | 30 | 99+ | 98 |
| 250 | <1 | 60 | 99+ | 96 |

*Samples analyzed again 30 hours after the first analysis.

BRINE SLUDGE SAMPLE "B"

| Na2Sx added (ppm) | NaHs added (ppm) | Elemental Hg (ppb) | Total Hg (ppb) | Efficiency of Removal of Hg (%) Elemental | Total |
|---|---|---|---|---|---|
| — | Control | 150 | 5,200 | — | — |
| — | — | 30 | 430 | 80 | 92 |
| 50 | — | <3 | 65 | 98+ | 99 |
| 50 | 50 | <3 | 53 | 98+ | 99 |

As can be seen from the Table, the present invention reduces the mercury concentration in the filtrate (supernatant) to a value lower, by an order of magnitude, than that attained by the prior art.

EXAMPLE V

In a specific pilot plant trial on the use of polysulfide to precipitate mercury from brine sludge, 4 Imp. gallons of polysulfide solution (about 10% solution, based on dissolved sulfur) were added to the brine sludge tank containing 12,000 Imp. gallons of brine sludge (approximately 2% suspended solids). The elemental mercury content of the sludge before treatment was 17 ppb and this was reduced to less than 2 ppb with treatment (88.3% removed). The total mercury in the supernatant was reduced from 3900 ppb to about 60 ppb. (98.5% removed).

EXAMPLE VI

A sample from the perimeter sewer was treated at a pH of 9.5 as indicated in Table IV. A flocculating agent in the amount of 4 ppm was added and time was provided for settling before the treated sample was tested.

TABLE IV

PERIMETER SEWER

| Na2Sx added (ppm) | NaHS added (ppm) | Hg in Supernatant Elemental Mercury (ppb) | Total Mercury (ppb) | Removal Efficiency for Hg (%) Elemental | Total |
|---|---|---|---|---|---|
| — | — | 110 | 250 | — | — |
| 50 | — | 5 | 28 | 95 | 89 |
| — | 50 | 76 | 100 | 31 | 60 |
| 50 | 50 | 3 | 20 | 97 | 92 |

It will be apparent that the present invention provides a very effective way of reducing the mercury contamination of a wide variety of aqueous media. The examples have all been directed to effluent media from a chlor-alkali plant but obviously the invention need not be limited to such media.

Modifications may be made without departing from the spirit of the invention as defined in the appended claims.

We claim:

1. A process for the treatment of aqueous effluent from a chlor-alkali plant containing elemental mercury and other undissolved solids to convert substantially all said elemental mercury to a stable form that does not contaminate the environment consisting essentially of: adding a water-soluble polysulfide to said solids containing effluent at a pH in the range 7–13 in an amount sufficient to combine with substantially all said elemental mercury to form insoluble mercury sulfide and separating solids from said effluent.

2. A method as defined in claim 1 wherein said polysulfide is a sodium polysulfide.

3. A method is defined in claim 1 wherein said effluent also includes ionic mercury and wherein a soluble sulfide is also added to said effluent, said polysulfide and said sulfide being present in the amount to combine with substantially all of said elemental mercury and ionic mercury in said effluent.

4. A method is defined in claim 3 wherein said sulfide and said polysulfide are sodium polysulfide and sodium sulfide.

5. A method is defined in claim 3 wherein said pH is in the range of 9 to 12.

6. A method as defined in claim 3 further comprising separating the mercury sulfide from said effluent before a significant portion of said mercury sulfide has time to resolublize.

7. A method as defined in claim 6 wherein said mercury sulfide is separated from said effluent immediately after said mercury sulfide is formed.

* * * * *